United States Patent [19]

Capasso

[11] Patent Number: 4,830,117

[45] Date of Patent: * May 16, 1989

[54] SHUT-OFF DEVICE FOR AN AUTOMATIC SPRINKLER

[75] Inventor: Vincent J. Capasso, Landsale, Pa.

[73] Assignee: Fire Sprinkler Specialties, Inc., Chalfont, Pa.

[*] Notice: The portion of the term of this patent subsequent to Jun. 30, 2004 has been disclaimed.

[21] Appl. No.: 137,618

[22] Filed: Dec. 24, 1987

[51] Int. Cl.$^4$ .............................................. A62C 37/10
[52] U.S. Cl. ....................... 169/90; 169/37; 169/57
[58] Field of Search ............... 169/90, 57, 37, 38, 169/41; 137/382.5

[56] References Cited

U.S. PATENT DOCUMENTS 4,676,320 6/1987 Capasso ................................ 169/90

Primary Examiner—Sherman D. Basinger
Assistant Examiner—Thomas J. Brahan
Attorney, Agent, or Firm—Joseph W. Molasky & Assocs.

[57] ABSTRACT

A thermally responsive device for terminating the discharge of fire-extinguishing fluid from an activated sprinkler head of the pendent and sidewall type. The device includes a recessed seat which, when impressed onto an activated sprinkler head, returns the shut-off valve to the water emitting conduit to obturate fluid flow. The device is secured by a frictional locking means which allows it to remain in place as a guard against inadvertent discharge.

8 Claims, 4 Drawing Sheets

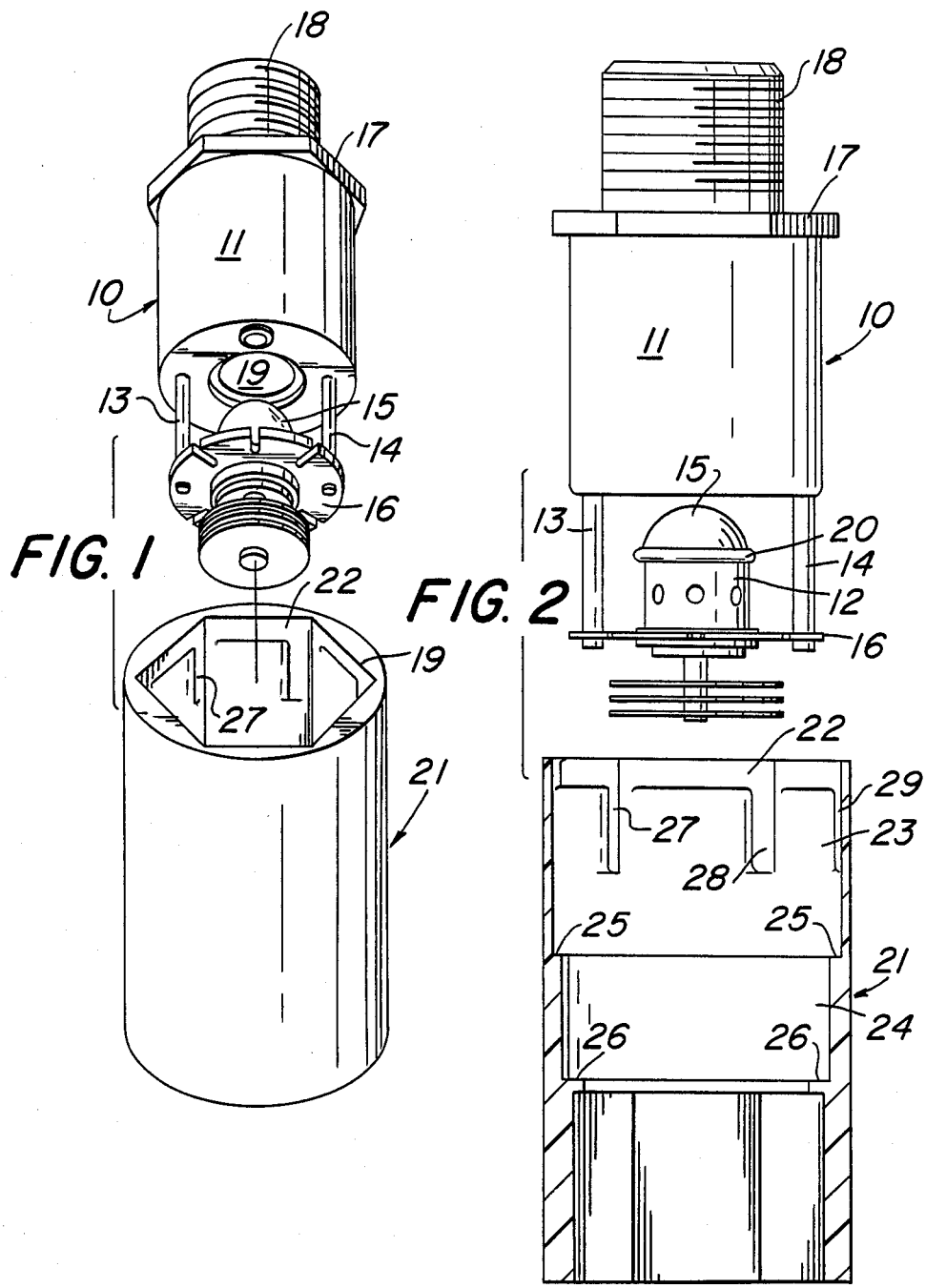

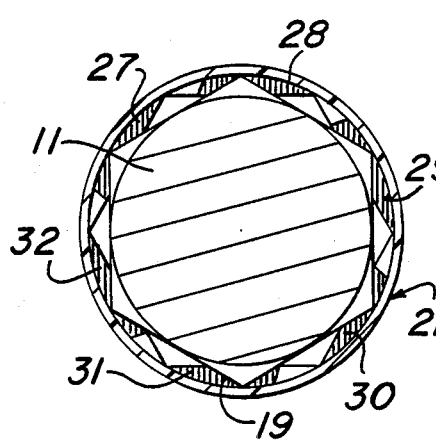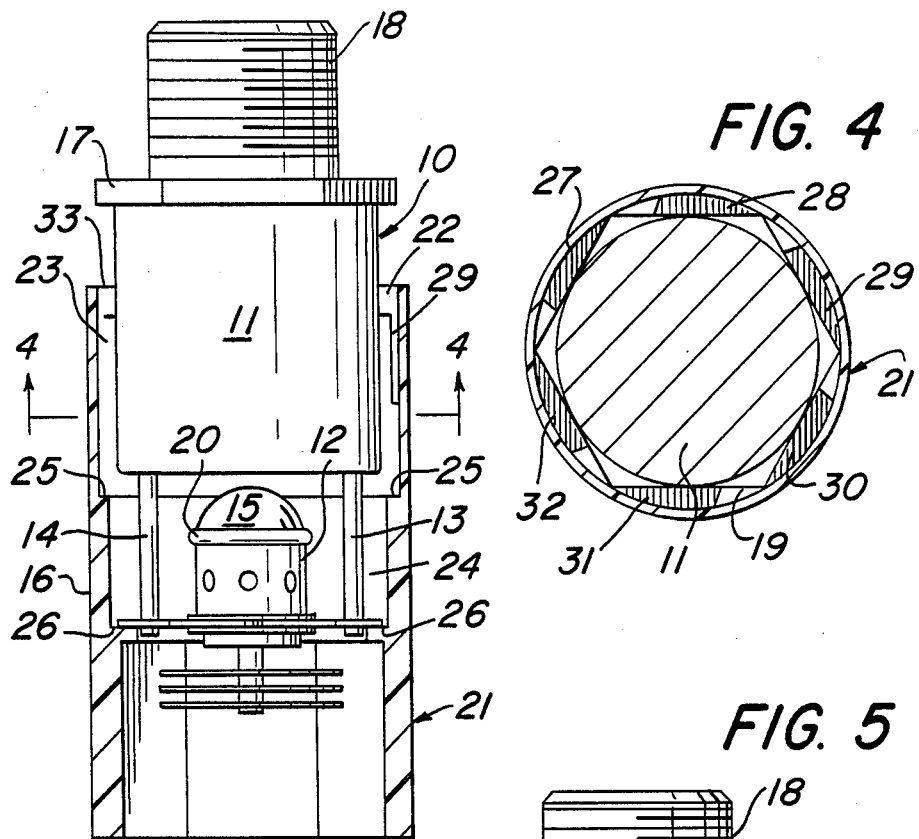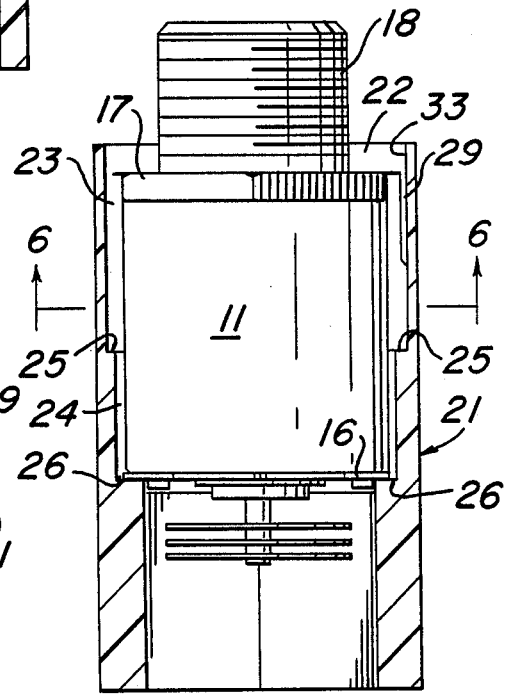

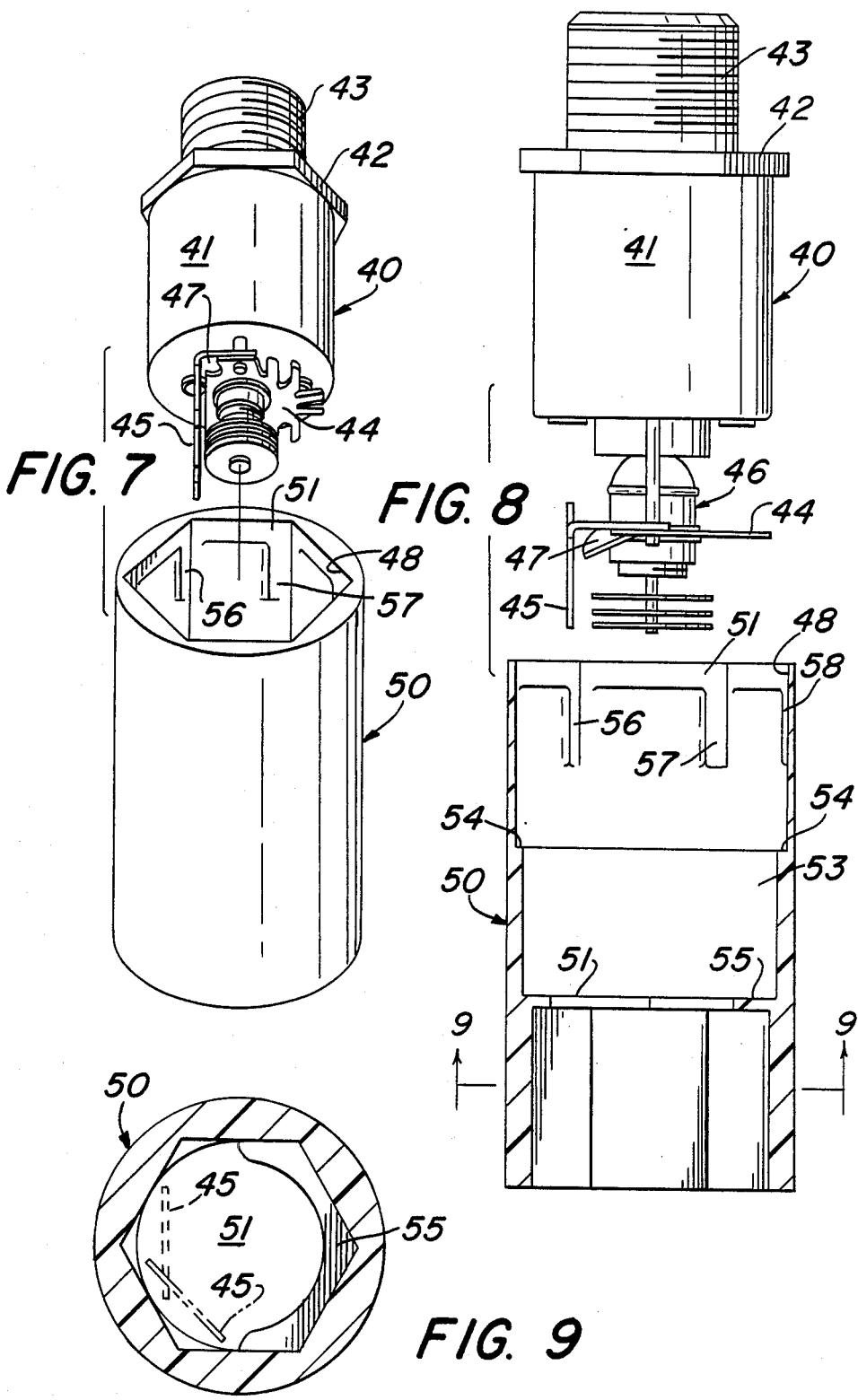

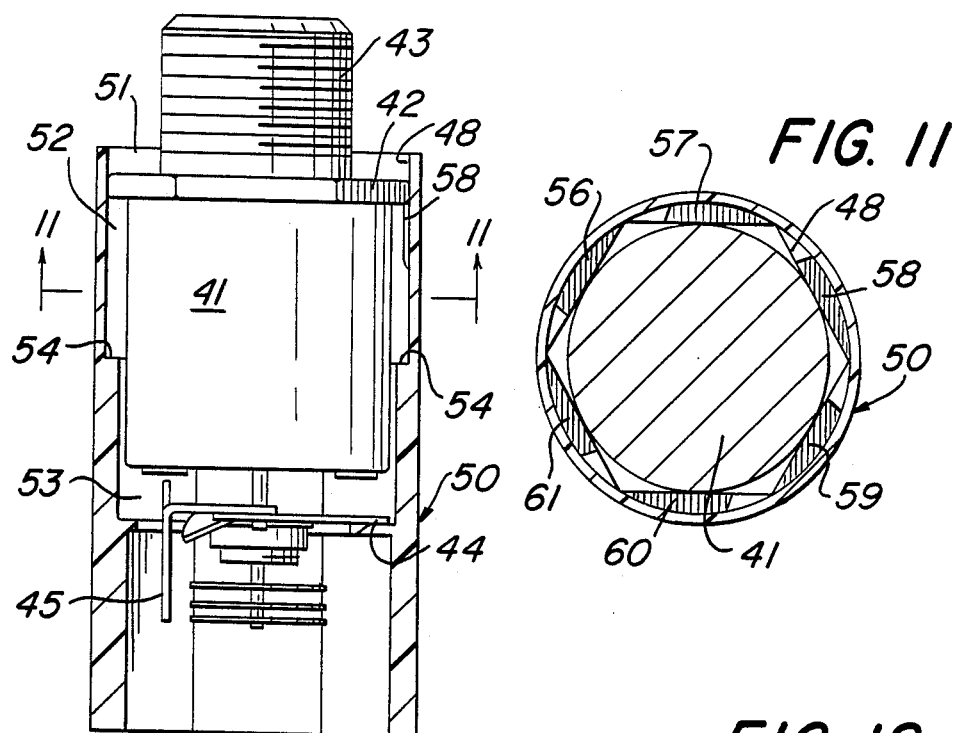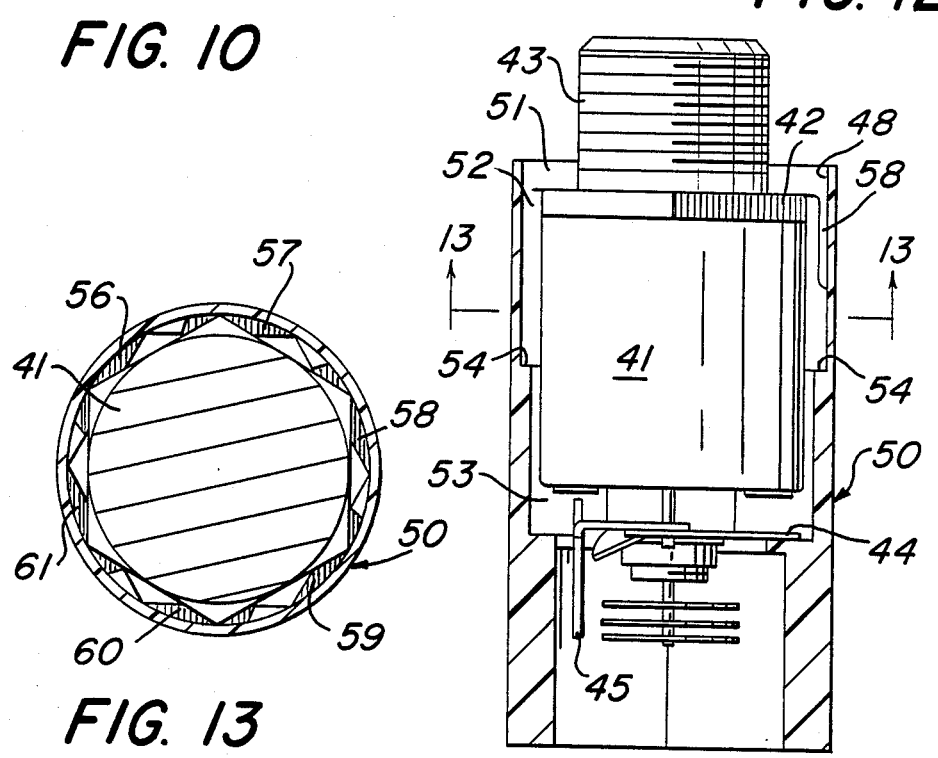

SHUT-OFF DEVICE FOR AN AUTOMATIC SPRINKLER

This invention relates to a shut-off device which is installed onto an activated sprinkler head equipped with a hexagonally shaped flange to terminate the flow of fire extinguishing fluids.

Specifically, this invention relates to a hollow cylindrical body equipped with means for interrupting the flow of fluid from an overhead valve-activated sprinkler by returning the shut-off valve to the fluid-conveying orifice. A locking means secures the shut-off device to the sprinkler head to ensure against inadvertent discharge.

Once fluid flow has been brought under control the device may be allowed to remain on the sprinkler assembly in a locked mode without impairing the ability of the sprinkler to perform in its intended manner. This is achieved by fabricating the device from thermoplastic compositions which melt at elevated temperatures so that the latter will be free to resume the fire-extinguishing operation.

BACKGROUND

Many buildings are equipped with gravity-fed or pressure supplied water sources which discharge fire-extinguishing fluids from overhead sprinklers at rates which can flood a building within a relatively short period of time. Accordingly, once a fire has been brought under control the sprinkler system must be inactivated with dispatch in order to avoid unnecessary water damage.

Unfortunately, however, most of the presently-available devices for closing down an activated sprinkler are awkward to install and they require the application of such force that damage to the sprinkler head often occurs.

Accordingly, there is a need for a safe and effective device by which to avoid the damage resulting from a runaway sprinkler.

In U.S. Pat. No. 2,666,670, Vincent McGraw describes a closure device which installs easily and snaps away from the sprinkler head when the system is activated. However, this snap-away device has application only on dry sprinkler heads, that is, systems in which the heads do not contain a supply of fire-extinguishing fluid per se but which rely, instead, upon a water reservoir maintained at a remote source. The McGraw device has no application to wet sprinklers which contain within the head a supply of water for immediate discharge.

In U.S, Pat. No. 3,223,171, Walter DeGroot describes a closure plug comprised of telescoping members which are spring loaded. The spring has a compressive force which is at least equal to the force exerted by the water in the supply line to ensure that the plug will not be rejected. This plug is installed by the use of a mounting pole equipped with a triggering mechanism.

The DeGroot plug is neither inexpensive to manufacture or practical in its application because, in time, the spring assembly corrodes, loses its resiliency and becomes inoperable. Moreover, the inserted plug remains fixed and, as a consequence, the system cannot be reactivated until the plug is removed by hand.

From the foregoing it is obvious that a need remains for a closure device which can be used to terminate the flow of water from an activated sprinkler head in an effective, safe, convenient and inexpensive manner.

Moreover, there is a need for a closure device which can be allowed to remain on a sprinkler head in an inconspicuous manner and does not require manual removal.

The present invention fills these needs by providing a closure device which can be manufactured inexpensively in volume and installed rapidly without difficulty.

THE INVENTION

It is an object of this invention to provide a shut-off device for terminating the flow of fluid from an activated overhead sprinkler in a cost effective manner with a modicum of effort.

More specifically, it is an object of this invention to provide a shut-off device which can be locked in place on an activated sprinkler head to obturate the flow of water and secure the device against future inadvertent discharge.

Still another object is to provide a shut-off device which is locked onto a sprinkler head and can be left unattended in a locked mode without compromising the ability of the sprinkler head to be reactivated and resume its fire-extinguishing capabilities.

These and other objects are achieved by providing an integrally formed shut-off device which can be manufactured at low cost and installed rapidly onto an activated sprinkler head in a safe and effective manner.

The present invention provides for terminating fluid flow in sprinkler heads of the pendent and sidewall type, that is, sprinkler heads which contain either a baffle plate for distributing water in a uniform pattern in all directions or a baffle plate equipped with a sidewall member and fingers for directing water in one direction only. Although these sprinkler heads differ in their water distributing means they are similar in structure and function. Most notably, they possess an identical hexagonal flange member and this feature allows the present device to be installed on both types of sprinklers with equal facility.

Structurally, the present device consists of a hollow cylindrical body equipped at one end with a hexagonal orifice for receiving the hex-shaped flange of a sprinkler head assembly. Beneath said orifice there are disposed two recessed sections of consecutively smaller diameter the second or smaller of which includes a circumscribing seat for engaging the baffle plate of a sprinkler head. When the device is impressed onto an activated sprinkler the circumscribing seat engages said baffle plate and returns the sprinkler shut-off valve to the water transmitting conduit. This operation obturates fluid flow and allows the operator to secure the sprinkler against further discharge by placing the device in a locking mode.

Locking is achieved by turning the device in a clockwise direction so as to bring the sprinkler head flange into engagement with a plurality of stop members which are joined serially to the inner sidewalls of the first recess section. The stop members extend downwardly into the recess for about half its length and they are triangular in cross section, a feature which allows the user to bring said stop members into frictional engagement with the corners of the sprinkler head flange by rotational means.

In its locked mode the present device does not interfere with the ability of the sprinkler head to function in its intended manneer because it is fabricated from compositions which melt at sprinkler-activating temperatures.

In conventional sprinklers the cut-off valve remains within the fluid-emitting orifice so long as ambient temperatures prevail; however, as temperatures reach critical levels the fusible composition melts and the prevailing water pressure eventually causes the valve to be emitted. The present device is fabricated from compositions which have a melting point essentially identical to that of the fusible composition so that the device becomes molten and falls away from the sprinkler head at approximately the same time as the cut-off valve is emitted from the water-transmitting conduit.

Materials suitable for fabricating the present device include, for example, thermoplastic resins having a melting point of from about 100°-250° C., preferably, 105°-110° C. Typical of these are, for example, cross-linked copolymeric resins derived from styrene and acrylonitrile which melt at temperatures of about 120°, and, also, copolymers of styrene, acrylonitrile and butadiene which exhibit a melting point range of from about 105°-115° C. Polysulfones, particularly the polyethersulfones, are also suitable as fabricating resins for the device of this invention, but the cross-linked reaction product of styrene and acrylonitrile is especially suitable and this resin constitutes a preferred fabricating material for this invention.

Other thermoplastic resins which may be employed are those drived from the copolymerization of trioxane with a minor amount of an acetyl comonomer. These resins possess carbon-to-carbon bonds in the polymer chains and they stabilize the polymer against various forms of degredative attack. When, for example, highly oxidative or acidic conditions are present this type of copolymer exhibits high stability and depolymerization generally stops short of the carbon-to-carbon link. Hydroxyethyl terminal units within the polymer chain also confer a high resistance to strongly alkaline environments. Copolymer resins which may be used to fabricate the device of this invention are those having a melting point range of from about 165°-250° C., as, for example, the resin known commercially as CELACON, a product of Celanese Engineering Resins of Chatham, NJ, which melts at about 165° C.

These and other features of the invention will be made apparent from The Drawings and the Description of the Preferred Embodiments.

THE DRAWINGS

FIG. 1 is a perspective view showing one form of shut-off device according to this invention with a pendent-type sprinkler head.

FIG. 2 is a side sectional view of the shut-off device and sprinkler head shown in FIG. 1.

FIG. 3 is a side sectional view showing the shut-off device of FIG. 1 with a pendent-type sprinkler head in an initial engagement stage.

FIG. 4 is a stop sectional view showing the shut-off device and sprinkler head of FIG. 3 along line 4—4.

FIG. 5 is a side sectional view showing the shut-off device of FIG. 1 with a pendent-type sprinkler head in a locked mode.

FIG. 6 is a top sectional view of the shut-off device and sprinkler head shown in FIG. 5 along line 6—6.

FIG. 7 is a perspective view showing an alternative shut-off device according to this invention with a sprinkler head of the sidewall type.

FIG. 8 is a side sectional view of the shut-off device of FIG. 7 shown with an activated sprinkler head of the sidewall type.

FIG. 9 is a top sectional view of the shut-off device shown in FIG. 8 along line 9—9 with a segment of the sprinkler head assembly shown in phantom.

FIG. 10 is a side sectional view showing the shut-off device of FIG. 7 with the sidewall-type sprinkler head in an initial engagement stage.

FIG. 11 is a top sectional view showing the shut-off device and sprinkler head of FIG. 10 along line 11—11.

FIG. 12 is a side sectional view showing the shut-off device of FIG. 7 with a sidewall-type sprinkler head in a locked mode.

FIG. 13 is a top sectional view showing the shut-off device and sprinkler head of FIG. 12 along line 13—13.

DESCRIPTION OF THE PREFERRED EMBODIMENTS

No claim of movelty is asserted for the sprinkler heads served by the present device but their construction and mode of operation are relevant to this invention and, therefore, they are discussed briefly hereinbelow.

Pendent type:

In FIGS. 1-6 there is shown a pendent-type sprinkler 10 equipped with a threaded conduit 18 for conveying fluid from an overhead water supply (not shown) through a fluid-emitting orifice 19. Suspended beneath the sprinkler housing 11 on guide rods 13 and 14 which can be raised or lowered is a baffle plate 16 and valve assembly for dispersing the emitted stream in a generally uniform pattern in finely divided form.

In FIGS. 1 and 2 the baffle plate and valve assembly are shown in an operational mode, that is, in position to receive the liquid stream from orifice 19, whereas, FIG. 5 shows this assembly in a non-discharge mode.

The valve assembly consists essentially of a valve member 12 to which has been joined a sealing ring 20 and a rounded valve head 15 for guiding said assembly into orifice 19. When the ring 20 engages said orifice it plugs the opening and terminates fluid flow.

The shut-off device for the pendent sprinkler 10 is shown generally as 21 in FIGS. 1-6. This device consists essentially of a hollow cylindrical body equipped at one end with a hexagonl orifice 33 and a circumscribing inner sidewall 22. Beneath said orifice there are disposed, one above the other, two recess sections 23 and 24 which are adapted to receive the housing 11 of a pendent-type sprinkler head 10. The first recess 23 descends within said body for a distance which is only slightly greater than the combined length of sprinkler housing 11 and flange member 17, whereupon, it terminates in a circular seat 25 which extends laterally into the cavity formed by recess 23.

The second recess 24 has a diameter slightly smaller than that of recess 23 and it too is adapted to receive the sprinkler head housing 11. Moreover, this recess also terminates in a circular seat 26 which extends laterally from the sidewalls of said recess to afford an abutment for engaging baffle plate 16 of the sprinkler head assembly.

Joined to the inner sidewalls of the first recess section and extending downwardly for about half its length are longitudinally disposed stop members 27, 28, 29, 30, 31 and 32. Each stop member is triangular in cross-section and obtusely biased to engage the corners of the sprinkler head flange 17 when the inserted assembly 10 is rotated in a clockwise direction (FIG. 6).

Operation:

When a pendent sprinkler head 10 is installed as a fixture in a building or other structure the sealing ring 20 is held within the discharge orifice 19 by a fusible composition which is temperature responsive. Thereafter, should ambient temperatures rise to incendiary levels the composition becomes fluid, the sealing ring 20 is released and the water pressure within conduit 18 causes valve member 12 to be expelled from the discharge orifice 19. The resulting stream comes into contact with valve head 15 and baffle plate 16 and it is distributed uniformly to adjacent areas in the form of a finely divided spray.

The present device 21 obturates fluid flow by returning the valve member 12 and sealing ring 20 into the discharge orifice 19. This is achieved by aligning the hexagonal opening 33 of said shut-off device with the underside of the activated sprinkler head 10 (FIGS. 3 and 4) and impressing the former upwardly until flange 17 passes the sidewall member 22. This operation brings seat 26 into simultaneous engagement with the underside of baffle plate 16 and returns the sealing ring 20 into orifice 19 as shwon in FIG. 5.

If the installed device is to be left unattended then it must be locked to ensure against inadvertent discharge. Locking is achieved by turning the closure device 21 in a clockwise direction so as to bring the corner segments of flange 17 into frictional engagement with the biased portion of longitudinal stop members 27, 28, 29, 30, 31 and 32 (FIG. 5). This engagement also places flange 17 beneath the lip formed by sidewall member 22 in recess 23 (FIG. 6) and this operation ensures the locking arrangement.

The shut-off device 21 may remain in place on the sprinkler assembly in a locked mode without impairing the sprinkler's ability to perform in its intended manner. This is achieved by virtue of the thermoplastic composition which melts at levels corresponding essentially to sprinkler-activating temperature. As a result, when ambient temperatures rise to incendiary levels, that is, levels of from about 100°–250° C., the device 21 becomes fluid, separates, and allows the sprinkler head to resume its fire-quenching operation.

Sidewall Type:

In FIGS. 7–13 there is shown a shut-off device for inactivating a sprinkler head of the sidewall type. The sidewall sprinkler 40 is essentially identical to the pendent-type sprinkler 10 shown in FIGS. 1–6 except that the baffle plate 44 is characterized by projecting fingers and a vertically disposed deflector 45 for directing water in a single direction only.

The shut-off device which serves this sprinkler is the hollow cylindrical body shown generally at 50 in FIGS. 7–13. This device is characterized by a hexagonal orifice 48 and a circumscribing sidewall 51 beneath which there are disposed two recess chambers 52 and 53 of consecutively smaller diameter (FIG. 8).

The first recess 52 terminates in a seat 54 which circumscribes the inner sidewalls of said chamber and the second recess 53 terminates in an arcuate abutment 55 (FIG. 9) which extends perpendicularly from the inner sidewalls to form a projecting lip of determinate length for engaging the baffle plate 44 of the sprinkler head assembly. As can be seen in FIG. 9 the arcuate abutment 55 traverses a section only of the sidewall in recess 53 so that there remains open within the recess cavity an access area 51 for receiving the vertically disposed deflector 45 of baffle plate 44.

Extending downwardly within the first recess section and joined to its inner sidewalls are longitudinally disposed stop members 56, 57, 58, 59, 60 and 61. These members are obliquely inclined to provide a biased face which engages the corners of the sprinkler head flange 42 when the device 50 is rotated in a clockwise direction.

The sidewall-type sprinkler head 40 is activated when ambient temperature rech critical levels in which event the valve assembly 46 is discharged from the water conveying orifice (not shown) and the resulting stream is directed outwardly onto the projecting fingers of baffle plate 44 and onto the vertically disposed sidewall member 45 via opening 47.

Operation:

To obturate fluid flow the shut-off device 50 must be inserted onto the sprinkler head 40 with a force greater than that exerted by the fluid within conduit 43. Installation is achieved by fitting the device 50 onto the sprinkler head housing 41 and aligning the hexagonal orifice 48 with the hexagonal flange 42. When registry is assured the device is impressed upwardly onto the sprinkler head so as to urge the flange member 42 beyond the circumscribing wall 51.

To achieve locking the shut-off device 50 is rotated slightly in a clockwise direction so as to bring the end segments of flange 42 into frictional engagement with the bias portion of stop members 56, 57, 58, 59, 60 and 61. In addition to the engagement with stop members 56–61 this rotational step also places the end segments of flange 42 beneath the lip formed by the combination of circumscribing wall 51 and the sidewall of the first recess chamber 52 and it ensures that the device cannot be expelled inadvertently or as the result of pressure exerted by fluid in the supply lines.

The shut-off device 50 can be removed from the sprinkler head assembly 40 by rotating the former in a counterclockwise direction and withdrawing the device in a downward fashion.

Alternatively, the shut-off device 50 can be allowed to remain on the sprinkler head without compromising the sprinkler's ability to function in its intended manner because it is fabricated from thermoplastic compositions which melt at sprinkler-activating temperatures and in a fire emergency the shut-off device 50 will melt, separate and return the sprinkler head to an operable mode.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A device for terminating fluid flow in a temperature-activated sprinkler head consisting essentially of a water conduit, a hexagonally-shaped flange, circular housing, baffle plate and cut-off valve, which comprises:

(1) a cylindrical hollow body having at one end a hexagonally-shaped orifice for receiving the flange of said sprinkler head, said body consisting esssentially of a thermoplastic composition which melts at sprinkler-activating temperatures;

(2) a first recess extending downwardly beneath said orifice and adapted to receive the circular housing of said sprinkler head;
(3) a first circular seat which circumscribes the interior sidewall of said body and abuts said first recess;
(4) a second recess which extends downwardly beneath the first circular seat and which is also adapted to receive said circular housing;
(5) a second circular seat which circumscribes the interior sidewall of said body and abuts said second recess; and
(6) a plurality of longitudinally disposed stop members joined to the interior sidewall of said first recess and extending downwardly beneath said orifice to provide means for frictionally engaging said flange.

2. The device according to claim 1 wherein said stop members are serially arranged and extend downwardly from the vertexes of said orifice.

3. The device according to claim 1 wherein each stop member is triangular in cross-section and includes the sector formed by the curved surface of said body.

4. The device according to claim 3 wherein said triangular cross-section is obtuse.

5. The device according to claim 1 wherein the diameter of said first recess is slightly larger than the diameter of said second recess.

6. The device according to claim 1 wherein said thermoplastic composition is a resin having a melting point of from about 100°–250° C.

7. The device according to claim 6 wherein said resin is a cross-linked copolymer having a melting point of from about 105°–110° C.

8. The device according to claim 7 wherein said resin is a copolymer derived from styrene and acrylonitrile.

* * * * *